(12) United States Patent
Kim

(10) Patent No.: US 10,045,311 B2
(45) Date of Patent: Aug. 7, 2018

(54) METHOD AND APPARATUS FOR POWER CONTROL OF BEACON SIGNAL

(71) Applicant: SK PLANET CO., LTD., Seongnam-si, Gyeonggi-do (KR)

(72) Inventor: HyunWook Kim, Seongnam-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days.

(21) Appl. No.: 15/656,440

(22) Filed: Jul. 21, 2017

(65) Prior Publication Data
US 2017/0325180 A1 Nov. 9, 2017

Related U.S. Application Data

(63) Continuation of application No. 14/961,187, filed on Dec. 7, 2015.

(30) Foreign Application Priority Data

Apr. 14, 2015 (KR) .................. 10-2015-0052310

(51) Int. Cl.
*H04W 52/50* (2009.01)
*H04W 52/02* (2009.01)
*H04W 52/28* (2009.01)
*H04W 52/32* (2009.01)
*H04W 4/04* (2009.01)
*H04W 52/24* (2009.01)

(52) U.S. Cl.
CPC .......... *H04W 52/283* (2013.01); *H04W 4/04* (2013.01); *H04W 52/325* (2013.01); *H04W 52/50* (2013.01); *H04W 52/245* (2013.01)

(58) Field of Classification Search
CPC ...... H04B 7/0874; H04B 7/04; H04B 7/0413; H04B 7/0456; H04B 7/08; H04B 7/0802; H04B 7/0817; H04B 7/082; H04B 7/0868; H04B 7/0871; H04B 7/02
USPC ... 455/272, 273, 278.1, 277.1, 277.2, 279.1, 455/132, 133, 134, 135, 137, 138
See application file for complete search history.

(56) References Cited

U.S. PATENT DOCUMENTS

| | | | |
|---|---|---|---|
| 9,756,580 B2 * | 9/2017 | Kim | H04W 52/283 |
| 2016/0073429 A1 | 3/2016 | Oteri et al. | |
| 2016/0142856 A1 | 5/2016 | Worrall et al. | |

* cited by examiner

*Primary Examiner* — Philip Sobutka
(74) *Attorney, Agent, or Firm* — Brinks Gilson & Lione

(57) ABSTRACT

A method and apparatus for controlling a power level of a beacon signal including analyzing a beacon signal received from a beacon device, controlling a power level of a beacon signal transmitted to a beacon communication module of a user terminal through a user message generated by the user terminal, and providing service information based on information regarding a location where the user terminal is located in a shop and personal setting information of the user terminal. To this end, the user terminal may include a beacon signal analysis module configured to receive the beacon signal from at least one beacon device and analyze the received beacon signal, a beacon interoperating module configured to generate a user message on the basis of the analysis, and a transmission power control module configured to control transmission power according to a transmission power control message received from the management server.

8 Claims, 11 Drawing Sheets

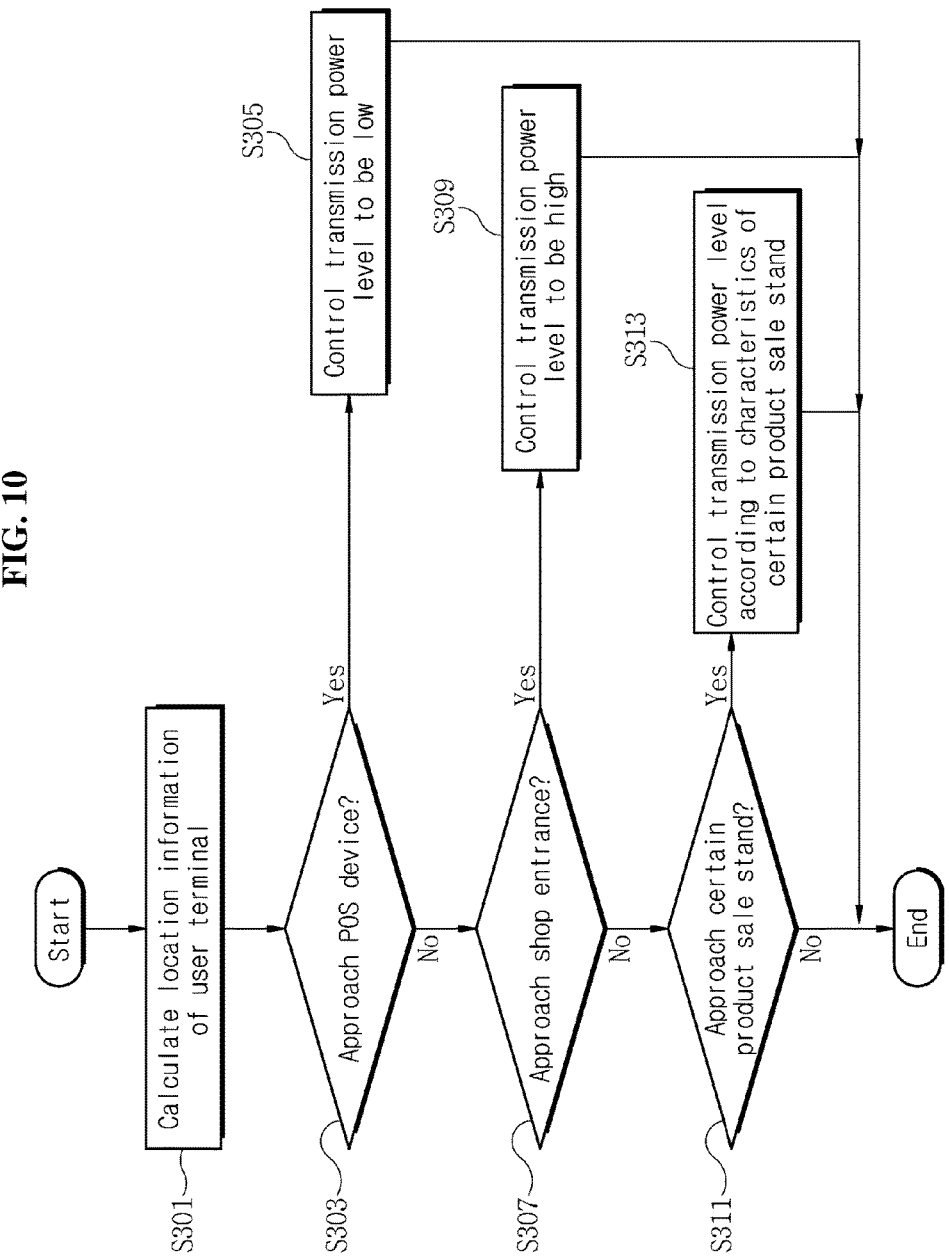

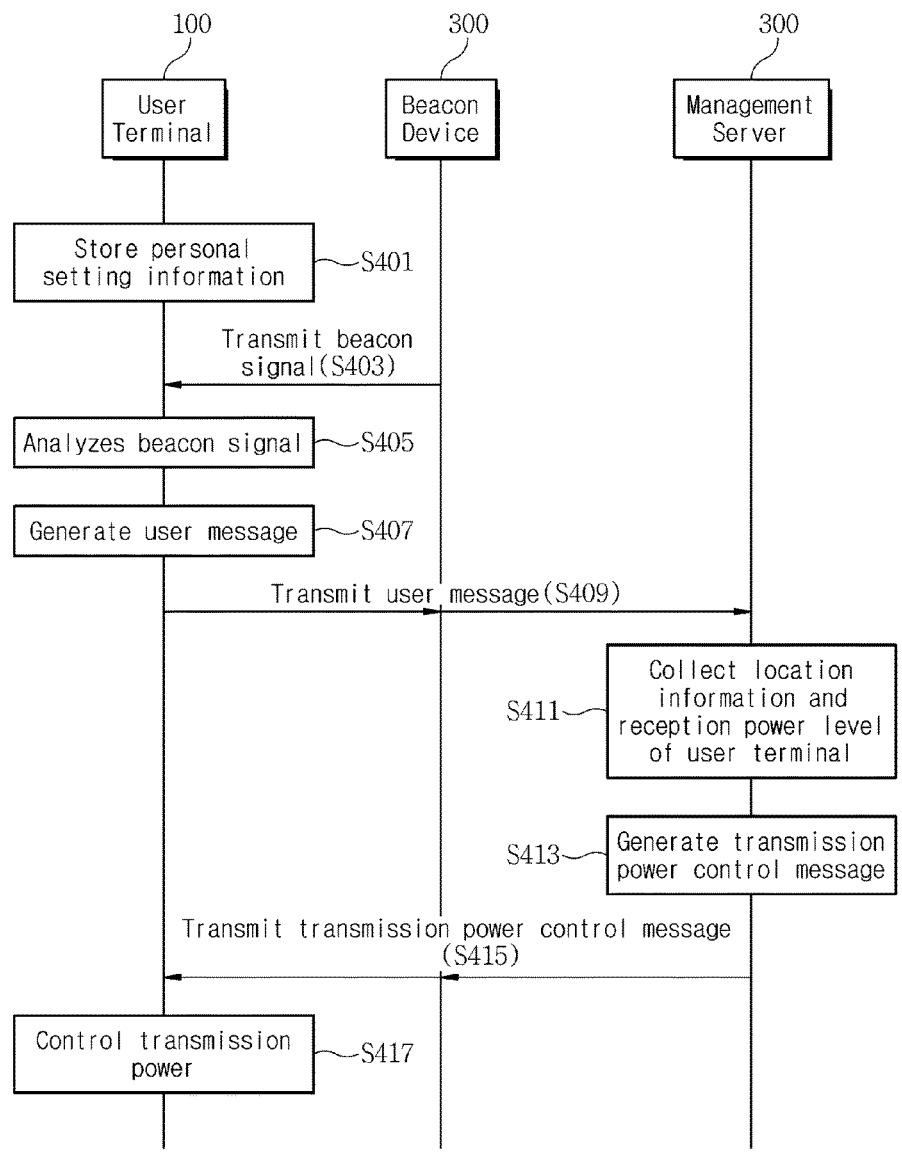

METHOD AND APPARATUS FOR POWER CONTROL OF BEACON SIGNAL

CROSS-REFERENCE TO RELATED APPLICATION

This present application is a continuation of U.S. patent application Ser. No. 14/961,187 filed Dec. 7, 2015, which is based on and claims priority to and the benefit of Korean Patent Application No. 10-2015-0052310 filed in the Korean Intellectual Property Office on Apr. 14, 2015, the entire contents of which are incorporated herein by reference.

TECHNICAL FIELD

The present invention relates to a method and apparatus for controlling a power level of a beacon signal, and more particularly, to a method and apparatus for controlling a power level of a beacon signal, by controlling a transmission power level of a user terminal through communication between a beacon device installed in a shop and a beacon communication module of the user terminal and providing personalized service information on the basis of information received from the user terminal.

BACKGROUND

This section is intended to merely provide background for embodiments of the present invention and is not considered prior art in the claims.

With the development of mobile communication networks and the advance in terminal specifications, mobile communication terminals have become the necessity for modern people and have evolved into total entertainment equipment beyond typical simple communication devices or information providing devices.

Such mobile communication terminals have a function for performing short-range wireless communication, such as a near field communication (NFC) or Bluetooth, in addition to a communication function through mobile communication networks.

NFC has a short communication distance and requires a separate wireless communication chip. However, Bluetooth has a relatively long communication distance and most terminals have a Bluetooth communication function equipped therein. Thus, various communication services are being developed using Bluetooth.

Further, service solutions for providing a variety of information to mobile communication terminals possessed by users are being developed using a beacon that utilizes Bluetooth communication. In this case, mobile communication terminals receive identification information corresponding to beacon devices and use the received identification information to acquire a variety of information.

Recently, mobile communication terminals are basically equipped with a Bluetooth low energy (BLE) function, and thus can use a function of transmitting BLE signals, in addition to a conventional function of receiving BLE signals.

In this case, electric field intensity of signals transmitted by mobile communication terminals may be used to find locations of the mobile communication terminals, and the locations may be used to provide various service information.

However, since transmission power of mobile communication terminals and beacon devices installed in a shop cannot be controlled depending on the size or other characteristics of the shop, a plurality beacon signals are transmitted even in a small shop and thus interference between the beacon signals may occur. Furthermore, since user information is provided whenever the user terminal is recognized, the user may be inconvenienced by receiving needless information.

PRIOR ART DOCUMENT

Patent Document

Korean Patent Application Publication No. 2014-0097074 published on Aug. 6, 2014, entitled "A System and Method of Advertisement and Auto-order for Restaurant Using Beacon (Bluetooth) Technology"

SUMMARY

The present invention is directed to controlling a power level of a signal transmitted by a user terminal through transmission and reception of signals between a beacon device installed in the user terminal and a beacon device installed in a shop, etc. and setting transmission power of the beacon signals according to characteristics of the shop. In addition, a management server is intended to provide a method and apparatus for controlling a power level of a beacon signal by communicating with the beacon device, transmitting and receiving a location of the user terminal and personal setting information of the user, and providing shop service information further needed by the user.

One aspect of the present invention provides a user terminal having a beacon communication module configured to transmit and receive signals to and from one or more beacon devices, the user terminal including: a beacon signal analysis module configured to, when a beacon signal periodically transmitted from a beacon device is received, analyze the beacon signal to extract received signal strength and beacon identification information; a beacon interoperating module configured to generate a user message including the extracted received signal strength and beacon identification information and user terminal identification information, transmit the generated user message to the beacon device, and receive a transmission power control message through the beacon device; and a transmission power control module configured to, when the transmission power control message is received through the beacon interoperating module, control transmission power of the beacon communication module according to the transmission power control message.

The beacon interoperating module may further include predetermined personal setting information into the user message in association with a beacon service.

The transmission power control message may include a transmission power control value and a control time, and the transmission power control module may change the transmission power of the beacon communication module to the transmission power control value, for the control time, when the transmission power control message is received.

Another aspect of the present invention provides a management server including: a collection module configured to receive a user message from a user terminal through one or more beacon devices and collect received signal strength, beacon identification information, and user terminal identification information of a beacon signal received from the user terminal from the user message; and a transmission power setting module configured to analyze the beacon signal and a change in strength thereof, which are received from the user terminal, based on the received signal strength, beacon identification information, and user terminal identification information collected by the collection module, estimate a location of the user terminal, set transmission power of the user terminal based on the estimated location, and transmit a transmission power control message through the beacon device.

The collection module may further collect personal setting information from the user message, and the management server may further include a service information providing module configured to provide the personal setting information and service information based on the location of the user terminal to the user terminal.

The transmission power setting module may set signal transmission power of the user terminal to be low when the user terminal is located around a payment device and may generate and transmit a beacon message for increasing the signal transmission power of the user terminal when the user terminal is located around a shop entrance.

Still another aspect of the present invention provides a method of providing a beacon service by a user terminal having a beacon communication module configured to transmit and receive signals to and from one or more beacon devices, the method including: receiving a beacon signal periodically transmitted from a beacon device; analyzing the received beacon signal to extract received signal strength and beacon identification information; generating a user message including the extracted received signal strength and beacon identification information and user terminal identification information; transmitting the user message to the beacon device; and receiving a transmission power control message through the beacon interoperating module and controlling transmission power according to the transmission power control message.

The generating of the user message may further include predetermined personal setting information into the user message in association with the beacon service.

The controlling of the transmission power may include receiving the transmission power control message including a transmission power control value and a control time and changing the transmission power of the beacon communication module to the transmission power control value, for the control time.

The controlling of the transmission power may include setting the transmission power control value and control time according to a result of analyzing the transmission power control message or setting the transmission power control value and control time based on a value input to an application of the user terminal.

According to an embodiment of the present invention, it is possible to provide personalized service information based on personal setting information input through an application installed in the user terminal. It is also possible to find the location of the user terminal in the shop by controlling transmission signal power of the user terminal through communication between a beacon device installed in the user terminal and a beacon device installed in the shop. It is also possible to accurately recognize only a user who intends to use the map by controlling the transmission power through transmission and reception of signals to and from the beacon device.

In addition, it is possible to receive only service information suitable for the purpose of utilizing the shop, thereby decreasing a users' inconvenience.

BRIEF DESCRIPTION OF DRAWINGS

FIG. 10 is a flowchart illustrating a transmission power setting method of a management server according to an embodiment of the present invention.

FIG. 11 is a sequence diagram illustrating a beacon signal power control service procedure according to an embodiment of the present invention.

DETAILED DESCRIPTION

Figure 1:
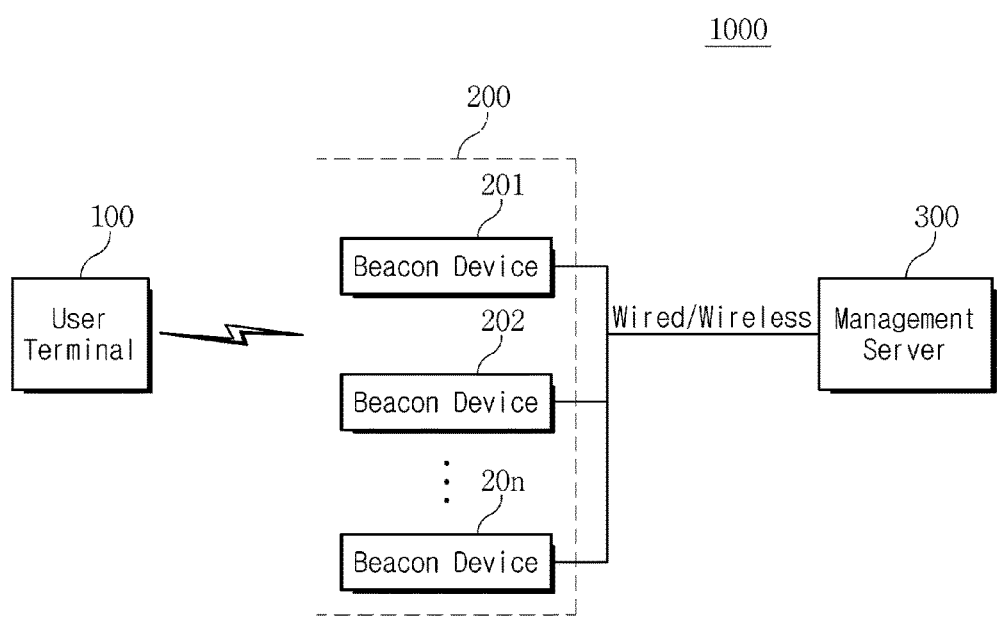
FIG. 1 is a block diagram illustrating a schematic configuration of a beacon signal power control service system according to an embodiment of the present invention.

Hereinafter, exemplary embodiments of the present invention will be described in detail with reference to the accompanying drawings. The features and advantages of aspects of the present invention will become more apparent from the detailed description set forth below.

However, detailed descriptions related to well-known functions or configurations will be ruled out in order not to unnecessarily obscure the subject matter of the present invention.

In addition, it should be noted that like reference numerals denote like elements throughout the specification and drawings.

The terms or words used in the following description and drawings should not be construed as being limited to typical or dictionary meanings, but should be construed as the meaning and concept corresponding to the technical idea of the present invention on the basis of the principle that an inventor can appropriately define the concept of the term for describing his or her invention in the best manner.

Accordingly, the configurations illustrated in embodiments and drawings described in the specification do not represent the technical idea of the present invention but are just exemplary embodiments. Thus, it should be understood that various equivalents and modifications may exist which can be replaced at the time of filing an application.

While the terms including an ordinal number, such as "first," "second," etc. may be used herein to describe various elements, such elements are not limited to those terms. The terms are only to distinguish one component from another. For example, a first component may be named a second component without departing from the scope of the present invention and the second component may also be similarly named the first component.

It is to be understood that when one element is referred to as being "connected to" or "coupled to" another element, it may be connected or coupled logically or physically. In other words, it is to be understood that one element may be directly connected or coupled to another element or indirectly connected or coupled to another element with a third element intervening therebetween.

In the following description, the technical terms are used only for explaining a specific exemplary embodiment while not limiting the present disclosure. An expression used in the singular encompasses the expression of the plural, unless it has a clearly different meaning in the context.

It will be further understood that the terms "include," "comprise," or "have" used in this specification, specify the presence of stated features, steps, operations, components, parts, or combinations thereof, but do not preclude the presence or addition of one or more other features, numerals, steps, operations, components, parts, or combinations thereof.

Embodiments within the scope of the present invention also include computer-readable media for carrying or storing computer-executable instructions and/or data structures. Such computer-readable media can be any available media that can be accessed by a general purpose or special purpose computer system. Thus, by way of example, and not limitation, the computer-readable media can include physical computer-readable storage media including RAM, ROM, EEPROM, CD-ROM or other optical disk storage, magnetic disk storage or other magnetic storage devices, or any other medium which can be used to store or deliver desired program code means in the form of computer-executable instructions, computer-readable instructions, or data structures and which can be accessed by a general purpose or special purpose computer.

In the following description and claims, the term "network" is defined as one or more data links that allow electronic data to be transmitted between computer systems and/or modules. When information is transferred or provided over a network or another communications connection (either hardwired, wireless, or a combination of hardwired or wireless) to a computer system, the computer system properly views the connection as a computer-readable medium.

The computer-readable instructions include, for example, instructions and data which cause a general purpose computer system or special purpose computer system to perform a certain function or group of functions. The computer-executable instructions may be, for example, binaries, intermediate format instructions such as assembly language, or even source code.

Furthermore, those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In addition, a beacon service according to an embodiment of the present invention will be described based on Bluetooth low energy (BLE) type data communication technology, but is not limited thereto.

While NFC technology may be available only within several tens of centimeters, Bluetooth technology may operate in the range of several tens of meters and thus have been applied to a wide variety of applications. In particular, the Bluetooth technology can transfer data even when a user just passes through a place where a beacon device is installed without needing to approach and then touch a reader like in NFC technology, and also can read even location movement inside a building and transfer customized data.

However, the beacon service according to an embodiment of the present invention is not necessarily limited to Bluetooth low energy (BLE) or Bluetooth. Accordingly, various Personal Area Network (PAN) type short-distance communication technologies such as Zigbee, Ultra WideBand (UWB), ANT, and Wi-Fi may be available.

A method and apparatus for controlling a power level of a beacon signal in a beacon service system according to an embodiment of the present invention will be described in detail with reference to the drawings.

First, a structure of a beacon service system according to an embodiment of the present invention will be described schematically.

FIG. 1 is a block diagram illustrating a schematic configuration of a beacon signal power control power system according to an embodiment of the present invention.

Referring to FIG. 1, a beacon signal power control service system 1000 according to an embodiment of the present invention may include a user terminal 100, a beacon device 200 configured to transmit and receive a beacon signal to and from the user terminal 100, and a management server 300 configured to control transmission power of the user terminal 100 through wired/wireless communication with the beacon device 200.

One or more beacon devices 200 may be provided according to an embodiment of the present invention. Each beacon device 200 may transmit and receive data in wired/wireless communication with the management server 300.

In the beacon signal power control service system 1000 of FIG. 1, each beacon device 200 may transmit and receive data to and from the management server 300.

Each element will be schematically described below. First, the user terminal 100 according to an embodiment of the present invention denotes a user device that may transmit and receive various types of data via a communication network according to manipulation of a user.

The user terminal 100 may perform voice or data communication through a communication network. For example, when a beacon signal is received from the beacon device 200, the user terminal 100 may generate a user message to transmit the user message to the management server via the beacon device 200 through wired/wireless communication. In addition, the user terminal 100 may communicate with the beacon device 200 and the management server 300 to receive various service information provided by the management server 300.

The user terminal 100 according to an embodiment of the present invention may include a memory that stores browsers, programs, and protocols for transmitting/receiving information, a microprocessor that executes various types of programs to perform calculation and control, etc.

In particular, the user terminal 100 according to an embodiment of the present invention may transmit and receive a beacon signal to and from the beacon device 200, receive a transmission power control message generated by the management server 300, control a beacon transmission power level of the user terminal, and receive service information from the management server 300 through information based on person setting information in the user terminal 100 and beacon signal information in the beacon device 200.

In this case, the personal setting information in the user terminal 100 may be transferred to the management server via the beacon device 200, and personalized service information may be received from the management server 300 through a communication network.

In addition, the user terminal 100 according to an embodiment of the present invention includes a beacon communication module that may communicate with the beacon device 200. The beacon communication module may be a BLE communication module that is based on Bluetooth communication (e.g., Bluetooth 4.0, i.e., Bluetooth low energy (hereinafter referred to as BLE)).

In particular, the user terminal 100 according to an embodiment of the present invention may perform a function of transmitting a beacon signal.

In other words, the user terminal 100 according to an embodiment of the present invention may scan a beacon signal transmitted from the beacon device 200 to extract an identification number and a reception power level from the beacon signal to generate a user message.

In this case, the user terminal 100 may transmit a user message at a default transmission power level and then control transmission power according to the transmission power control message received from the management server 300.

In addition, the user terminal 100 according to an embodiment of the present invention may install a service application and input personal setting information to the application. In this case, personal setting information including at least one of a user name, a favorite shop, a customer class, and user interest information may be input and then stored.

In addition, the user terminal 100 according to an embodiment of the present invention may receive a beacon signal from the beacon device 200 to control power of a signal transmitted from the user terminal 100 or use the application to arbitrarily set power of the beacon signal of the user terminal.

The user message generated by the user terminal 100 according to an embodiment of the present invention may include terminal identification information, the received beacon identification information, power level of the received beacon signal, and the personal setting information.

Here, the terminal identification information may include at least one of International Mobile Station Equipment Identity (IMEI), electronic serial number (ESN), and mobile identification number (MIN).

In this case, the user message is transmitted to the management server 300 via the beacon device 200, and location information and a reception power level of the user terminal 100, service information based on the personal setting information, and a transmission power control message are received from the management server 300 via the beacon device 200. In this case, the received service information may include at least one of location information, product information, coupon information, discount information, promotion information, shop-related additional information (e.g., a WiFi password, etc.), shop-associated event information, user point and accumulation information, personal coupon information, shop use information, a shop welcome greeting message, customer class-based coupon information.

In addition, when the user terminal 100 approaches a sale stand for a certain product, the service information may include at least one of product information, coupon information, discount information, promotion information, and event information which are associated with the product.

The user terminal 100 according to an embodiment of the present invention may generate a message of BLE Advertising Channel on the basis of information input through an application and transmit the message as the user message.

The user terminal 100 according to an embodiment of the present invention transmits a beacon signal, receives a beacon signal from the beacon device 200, generates a user message on the basis of the beacon signal, and controls a transmission power level through a transmission power control message received from the management server 300.

The beacon device 200 according to an embodiment of the present invention may be installed indoors, for example, inside a shop, and configured to operate inside the user terminal 100.

The beacon device 200 may transmit a beacon signal in a certain range from 5 cm to 49 m. The user terminal 100 may sense the beacon signal by continuously scanning whether the beacon signal is transmitted in the certain range.

An operating method of the user terminal 100 will be described in more detail, and the user terminal 100 according to an embodiment of the present invention may be implemented in various forms. For example, the user terminal 100 described in the specification may be a stationary terminal such as a smart TV, a desktop computer, and the like as well as a mobile terminal such as a smart phone, a tablet PC, a personal digital assistant (PDA), a portable multimedia player (PMP), and an MP3 player.

In accordance with the convergence trend of digital devices, there are various modifications of a mobile device, which are too many to enumerate. A unit equivalent to the above-described units may be used as the user terminal 100 according to an embodiment of the present invention. As long as any device transmits and receives information to and from the management server 300 through a communication network and transmits and receives information to and from the beacon device 200 in a short-range wireless communication scheme, the device may be applied as the user terminal 100 according to an embodiment of the present invention.

The beacon device 200 according to an embodiment of the present invention may transmit and receive the beacon signal to and from the user terminal 100 and may transmit the user message received from the user terminal 100 in order to measure a location of the user terminal 100.

The beacon device 200 according to an embodiment of the present invention use short-range wireless communication to transmit the beacon signal. The beacon device 200 may transmit the beacon signal using Bluetooth low energy (BLE), but is not limited thereto. The beacon device 200 may transmit the beacon signal using radio frequency identification (RFID), Zigbee, near field communication (NFC), etc.

The beacon device 200 according to an embodiment of the present invention is located in a shop and serves to transmit the beacon signal to one or more user terminals 100. In this case, the beacon signal transmitted by the beacon device 200 includes identification information for identifying the beacon device 200. The identification information included in the beacon signal may include at least one of a universally unique identifier (UUID) of the beacon device 200, a major indicating a group of beacon devices, and a minor indicating a certain beacon device in the group of beacon devices.

In particular, the beacon device 200 according to an embodiment of the present invention transmits the user message received from the user terminal 100 to the management server 300. In addition, the beacon device 200 may receive a transmission power control message and service information that are set on the basis of the location information and reception power level of the user terminal 100, the personal setting information, and so on from the management server 300 and may reset the transmission power information of the user terminal 100.

The management server 300 according to an embodiment of the present invention may communicate with the beacon device through wired/wireless communication to find location information of the user terminal 100 and provide the location information of the user terminal 100 to the beacon device 200 and the user terminal 100.

In addition, the management server 300 may generate and transmit the transmission power control message for controlling the transmission power level on the basis of the personal setting information input in an application of the user terminal 100 received through the beacon device 200 and the location information and reception power level of the user terminal 100 checked through the user message.

In addition, the management server 300 may transmit personalized service information to the user terminal 400 through wired/wireless communication. For example, the management server 300 may find a position of the user terminal 100 inside the shop and control a transmission power level of the beacon communication module of the user terminal 100 according to location information (e.g., a shop entrance, a point of sale (POS) device, and a sale stand for a certain product).

The main configurations and operating methods of the user terminal 100 and the management server 300 will be described below in more detail. A processor installed in each device according to an embodiment of the present invention may process program commands for executing the method according to an embodiment of the present invention. In one implementation, the processor may be a single-threaded processor. In alternative implementations, the processor may be a multithreaded processor. Furthermore, the processor may also process a command stored in a memory or a storage device.

In addition, the beacon device 200 and the user terminal 100 according to an embodiment of the present invention have been described as transmitting or receiving information in a BLE communication scheme, but are not limited thereto. If any communication scheme allows a certain signal including its own identification information to be transmitted, the communication scheme may be applied to an embodiment of the present invention.

Furthermore, the user terminal 100 and the management server 300 cooperate over a communication network. The communication network denotes a network, such as the Internet, the Intranet, a mobile communication network, a satellite communication network, etc., which is capable of transmitting or receiving data using an Internet protocol in various wired/wireless communication technologies. In addition, the communication network is combined with the management server 300 and configured to store computing resources such as hardware or software. The communication network includes networks such as Code Division Multiple Access (CDMA), Wideband Code Division Multiple Access (WCDMA), Global System for Mobile Communications (GSM), Long Term Evolution (LTE), Evolved Packet Core (EPC), and others, next generation networks and computing networks, in addition to a closed network (for example, a local area network (LAN), a wide area network (WAN), etc.) and an open network (for example, the Internet).

Moreover, the communication network according to an embodiment of the present invention may include, for example, a plurality of access networks (not shown) and core networks (not shown) and may further include an external network, for example, the Internet network (not shown). Here, each of the access networks (not shown) performs wired/wireless communication with the user terminal 100 and may be implemented with a plurality of base stations (BSs) such as a base transceiver station (BTS), a NodeB, and an eNodeB and a base station controller (BSC) such as a radio network controller (RNC).

In addition, as described above, a digital signal processing unit and a wireless signal processing unit that were integrally implemented in the base station are separated into a digital unit (hereinafter referred to as a DU) and a radio unit (hereinafter referred to as an RU), respectively. A plurality of RUs (not shown) may be installed in a plurality of regions and may be connected with a centralized DU (not shown).

In addition, the core network (not shown) constituting a mobile network along with the access network (not shown) serves to connect the access network (not shown) with an external network, for example, the Internet network (not shown).

As described above, the core network (not shown) is a network system that performs a main function for a mobile communication service such as mobility control and switching between the access networks (not shown) and is configured to perform circuit switching or packet switching and manage and control packet flow in the mobile network. In addition, the core network (not shown) may serve to manage mobility between frequencies and interoperate between traffic in the access network (not shown) and the core network (not shown) and another network, for example, the Internet network (not shown). The core network (not shown) may further include a serving gateway (SGW), a PDN gateway (PGW), a mobile switching center (MSC), a home location register (HLR), a mobile mobility entity (MME), and a home subscriber server (HSS).

In addition, the Internet network (not shown) may denote a typical open communication network through which information is exchanged according to a TCP/IP protocol, that is, a public network and may be connected with the management server 300 and configured to provide information provided from the management server 300 to the user terminal 100 via the core network and the access network (not shown).

Figure 2:
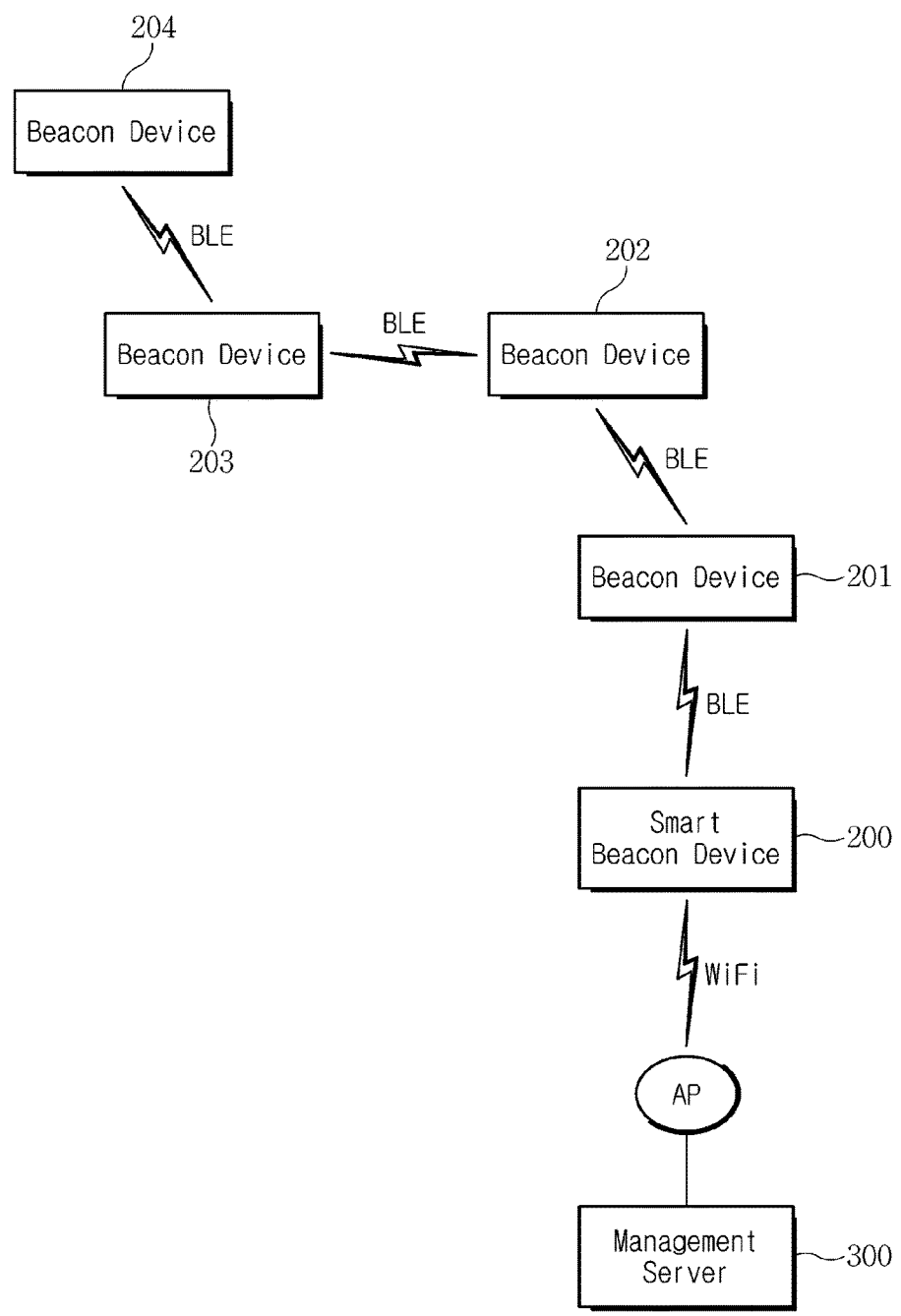
FIG. 2 is a block diagram illustrating another configuration of a beacon signal power control service system of FIG. 1 according to an embodiment of the present invention.

FIG. 2 is a block diagram illustrating a system 1010 having a different configuration from the beacon signal power control service system of FIG. 1 according to an embodiment of the present invention.

The beacon signal power control system shown in FIG. 2 has a more efficient configuration than the beacon signal power control system shown in FIG. 1, in which each beacon device communicates with the management server 300 to transmit and receive data.

Referring to FIG. 2, one or more beacon devices 200, 201, 202, 203, and 204 communicate in a wireless manner (e.g., through BLE communication). The beacon devices 200, 201, 202, 203, and 204 may be classified into a smart beacon device 200 and general beacon devices 201, 202, 203, and 204.

The smart beacon device 200 may wirelessly communication with the beacon devices 201, 202, 203, and 204 to transmit and receive data to and from the management server through wired or wireless communication. That is, the smart beacon device 200 may communicate with the beacon devices 201, 202, 203, and 204 in a BLE-based communication method and communicate with the management server 300 through WiFi and wired Internet connection to provide a beacon signal power control service according to an embodiment of the present invention.

Figure 3:
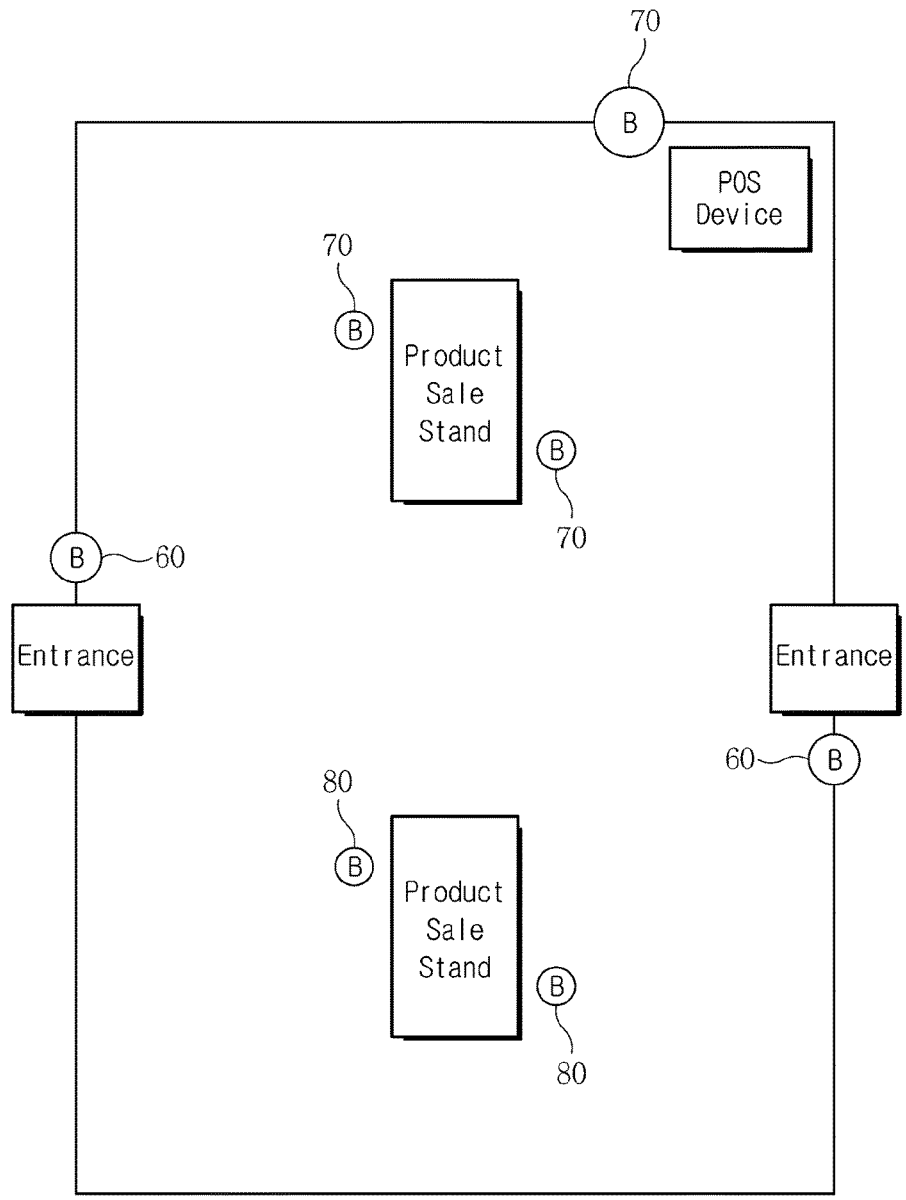
FIG. 3 is an exemplary view illustrating locations of installed beacon devices to describe a beacon signal power control service system according to an embodiment of the present invention.

FIG. 3 is an exemplary view illustrating installation locations of beacon devices to describe a beacon signal power control service system according to an embodiment of the present invention.

FIG. 3 shows an exemplary diagram 1030 indicating a place of a shop where the beacon device 200 is located. The beacon device 200 according to an embodiment of the present invention may include a beacon device 50 installed around a POS device, a beacon device 70 or 80 installed around a sale stand for a certain product, or a beacon device 60 located around a shop entrance.

When the user terminal 100 is located around the POS device, the user terminal 100 may recognize a beacon signal transmitted by the beacon device 50 around the POS device, generate a user message, and transmit the generated user message to the management server 300 via the beacon device 200 in default transmission power.

In addition, the management server 300 may collect location information, a reception power level, and personal setting information of the user terminal 100 through the received user message and may generate and transmit a message for reducing transmission power to the user terminal 100 on the basis of the collected information.

Thus, the user terminal 100 may transmit the beacon signal in low power, and the beacon device 200 around the payment device (e.g., the POS terminal) may receive a user message from the user terminal 100 that very closely approaches the beacon device 200 and recognize only the user terminal 100 that will use the POS terminal. In addition, the management server 300 may transmit service information to the user terminal 100 on the basis of the personal setting information and location information.

That is, the management server 300 may receive the user message of the user terminal 100 near the POS terminal and provide optimal service information to the user terminal scheduled to perform payment.

In this case, the service information may include at least one of product information, coupon information, discount information, promotion information, and event information which are associated with the product to be paid for.

When the user terminal 100 is located around a certain sale stand, the user terminal 100 may receive a beacon signal transmitted by the beacon device located in a certain place of the shop (e.g., the center of the shop), and generate and transmit a user message, reset transmission power through a transmission power control message received from the management server 300 via the beacon device 200, and receive service information including product information, coupon information, promotion information, and event information of a group of products displayed on the certain sale stand.

In this case, the beacon device 200 receives and provides the user message to the management server 300. The management server 300 receives the user message to collect the location information, reception power level, and personal setting information of the user terminal 100 and provides personalized service information. Here, when the user terminal 100 is moving to the certain sale stand, the beacon device 200 may provide service information including one or more of the product information, coupon information, discount information, promotion information, and event information which are associated with a certain product displayed on the certain sale stand. For example, when the user moves to a sale stand where cleaning tools are displayed, the management server 300 may provide product service information including one or more of the product information, coupon information, discount information, promotion information, and event information which are associated with the cleaning tools to the user terminal 100.

When the user terminal 100 is in close proximity to the sale stand, the user terminal 100 may receive a beacon signal transmitted by a beacon device 70 or 80 located around the sale stand, generate a user message, transmit the generated user message at a default power level, and collect information regarding the user terminal 100 including the location information, reception power level, personal setting information of the user terminal 100 through analysis of the user message by the management server 300. Next, the user terminal 100 may generate a transmission power control message on the basis of the collected information and transmit the generated transmission power control message to the user terminal 100 via the beacon device 200. In this case, the management server 300 may set the transmission power to a low level to transmit and receive data to and from only a nearby user terminal 100. In addition, the management server 300 may provide service information including at least one of product information, coupon information, discount information, promotion information, and event information which are associated with a certain product.

Furthermore, when the user terminal 100 is located at the shop entrance, the user terminal 100 recognizes a signal transmitted by the beacon device 60 installed in the shop entrance, generated a user message including personal setting information and terminal identification information of the user, and signals the user message to the user terminal 100 in addition to beacon signal information. In this case, the power level of the transmission signal is set as a default value and may be arbitrarily set through an application installed in the user terminal 100.

Here, the management server 300 may generate a message for increasing the transmission power level of the beacon communication module of the user terminal 100 located at the shop entrance and transmit the generated message to the user terminal 100 through the beacon device 200 around the shop entrance. The user terminal 100 may receive the message and control the transmission power thereof to be high.

In this case, the management server 300 may provide personalized service information on the basis of the location information and personal setting information of the user terminal 100. For example, the management server 300 may provide service information including at least one of location information, product information, coupon information, discount information, promotion information, shop-related additional information (e.g., a WiFi password, etc.), shop-associated event information, user point and accumulation information, personal coupon information, shop use information, a shop welcome greeting message, customer class-based coupon information.

Figure 4:
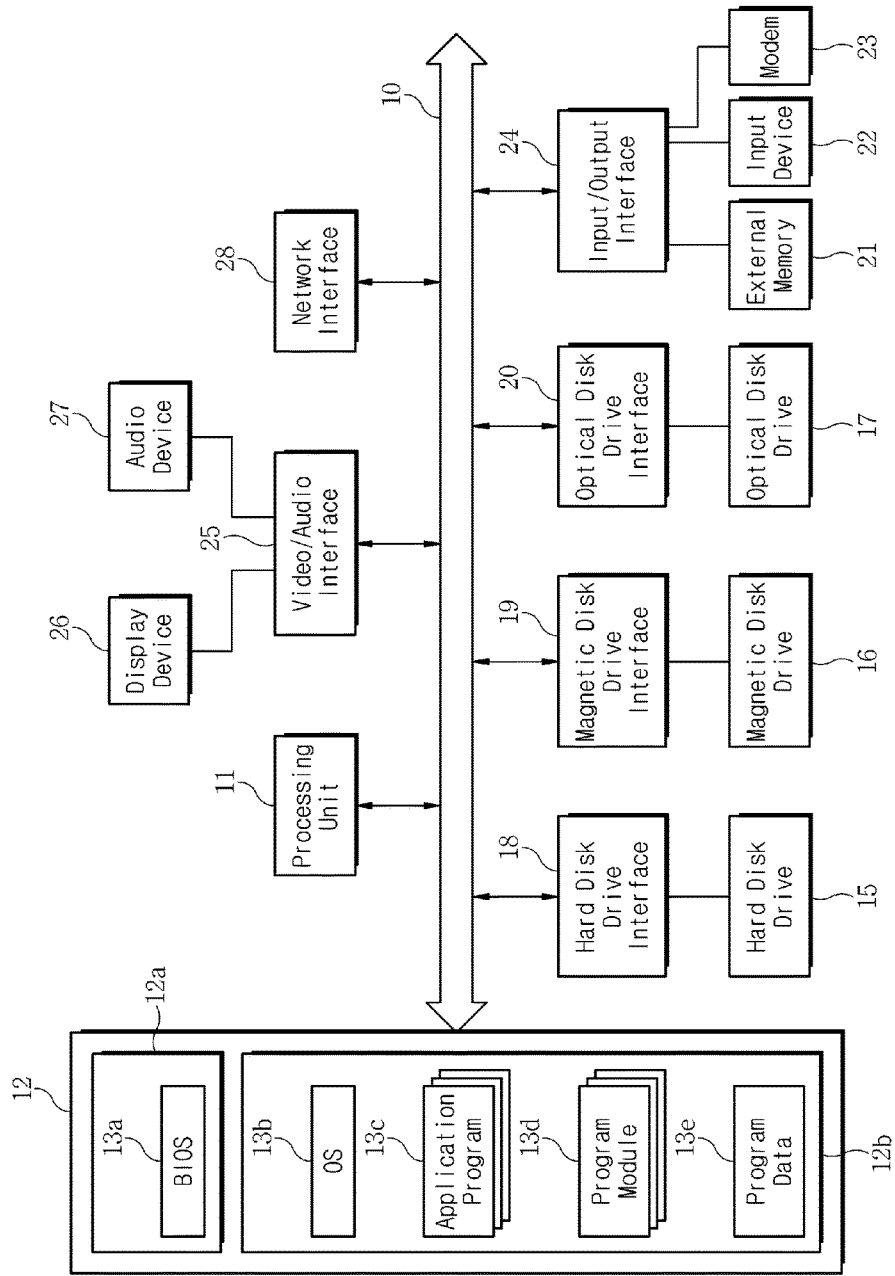
FIG. 4 is a block diagram showing an operating environment of an apparatus for providing a beacon signal power control service according to an embodiment of the present invention.

FIG. 4 is a block diagram showing an operating environment of an apparatus for providing a beacon signal power control service according to an embodiment of the present invention.

FIG. 4 and the following discussion are intended to provide a brief, general description of a suitable computing environment in which the present invention may be implemented. Although not required, the invention will be described in the general context of computer-executable instructions, such as program modules, being executed by computer systems.

Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

Referring to FIG. 4, an example computing system for implementing the invention includes a general-purpose computing device in the form of a computer system including a processing unit 11, a system memory 12, and a system bus 10 that couples various system components including the system memory 12 to the processing unit 11.

The processing unit 11 may execute computer-executable instructions designed to implement features of the present invention.

The system bus 10 may be any of several types of bus structures including a memory bus or memory controller, a peripheral bus, and a local bus using any of a variety of bus architectures. The system memory 12 includes a read only memory (ROM) 12a and a random access memory (RAM) 12b. A basic input/output system (BIOS) 13a, containing the basic routines that help transfer information between elements within the computing system, such as during start-up, may be stored in the ROM 12a.

The computing system may include a storage device including, for example, a hard disk drive 15 for reading information from or writing information to a hard disk, a magnetic disk drive 16 for reading information from and writing information to a magnetic disk, and an optical disk drive 17 for reading information from or writing information to an optical disk, such as, for example, a CD-ROM or other optical media. The hard disk drive 15, magnetic disk drive 16, and optical disk drive 17 are connected to the system bus 10 by a hard disk drive interface 18, a magnetic disk drive interface 19, and an optical drive interface 20, respectively.

In addition, the computing system may further include an external memory 21 as the storage device. The external memory 21 may be connected to the system bus 10 through an input/output interface 24.

The drives and their associated computer-readable media provide nonvolatile storage of computer-executable instructions, data structures, program modules, and other data. Although the example environment described herein employs the hard disk drive 15, the magnetic disk drive 16, and the optical disk drive 17, other types of computer-readable media for storing data may be used, including magnetic cassettes, flash memory cards, digital versatile disks, Bernoulli cartridges, RAMs, ROMs, and the like.

Program code means including one or more program modules may be stored in the hard disk drive 15, the magnetic disk drive 16, the optical disk drive 17, the ROM 12a, or the RAM 12b, including an operating system 13b, one or more application programs 13c, other program modules 13d, and program data 13e, which are loaded and executed by the processing unit 11.

Moreover, a user may enter commands and information into the computing system through a keyboard, a pointing device, or other input devices 22, such as a microphone, joy stick, game pad, scanner, or the like.

These input devices 22 can be connected to the processing unit 11 through the input/output interface 24 coupled to the system bus 10.

The input/output interface 24 logically represents any of a wide variety of possible interfaces, such as, for example, a serial port interface, a PS/2 interface, a parallel port interface, a Universal Serial Bus (USB) interface, or an Institute of Electrical and Electronics Engineers (IEEE) 1394 interface (i.e., a FireWire interface), or may even logically represent a combination of different interfaces.

In addition, the computing system according to the present invention may further include a display device 26 such as a monitor or liquid crystal display (LCD) and an audio device 27 such as a speaker or microphone. The display device 26 and the audio device 27 are connected to the system bus 10 through a video/audio interface 25.

For example, other peripheral output devices (not shown), such as, for example, speakers and printers, can also be connected to the computer system. The video/audio interface 25 may include a High Definition Multimedia Interface (HDMI), a Graphics Device Interface (GDI), etc.

In addition, the computing system is connectable to networks, such as, for example, an office-wide or enterprise-wide computer network, a home network, an intranet, and/or the Internet. The computer system can exchange data with external sources, such as, for example, remote computer systems, remote applications, and/or remote databases over such networks.

The computing system according to an embodiment of the present invention includes a network interface 28, through which the computing system receives data from external sources and/or transmits data to external sources.

In the present invention, the computing system may transmit information to or receive information from a device located in a remote position through the network interface 28.

For example, on a condition that the computing system denotes the user terminal 100, the computing system may transmit information to or receive information from the management server 300 and the beacon device 200 through the network interface 28. On a condition that the computing system denotes the beacon device 200, the computing system may transmit information to or receive information from the user terminal 100 through wired/wireless communication of the network interface 28.

The network interface 28 can logically represent one or more software and/or hardware modules, such as, for example, a network interface card and corresponding Network Driver Interface Specification (NDIS) stack.

Likewise, the computer system receives data from external sources and/or transmits data to external sources through the input/output interface 24. The input/output interface 24 may be coupled to a modem 23 (e.g., a standard modem, a cable modem, or a digital subscriber line (DSL) modem), through which the computer system receives data from and/or transmits data to external sources.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

Moreover, a variety of information that is generated when the beacon signal power control service program according to an embodiment of the present invention is executed may be stored and accessed from any of the computer-readable media associated with the computing system as shown in FIG. 4.

For example, portions of such program modules and portions of associated program data may be included in the operating system 13b, application programs 13c, program modules 13d and/or program data 13e, for storage in the system memory 12.

When a mass storage device, such as, for example, a hard disk, is coupled to the computing system, such program modules and associated program data may also be stored in the mass storage device.

In a networked environment, program modules associated with the present invention, or portions thereof, can be stored in remote memory storage devices, such as, for example, a system memory and/or mass storage devices associated with a remote computer system connected through the modem 23 of the input/output interface 24 or the network interface 28, for example, computing systems of the user terminal 100, the beacon device 200, and the management server 300. As described above, execution of such modules may be performed in a distributed environment.

Figure 5:
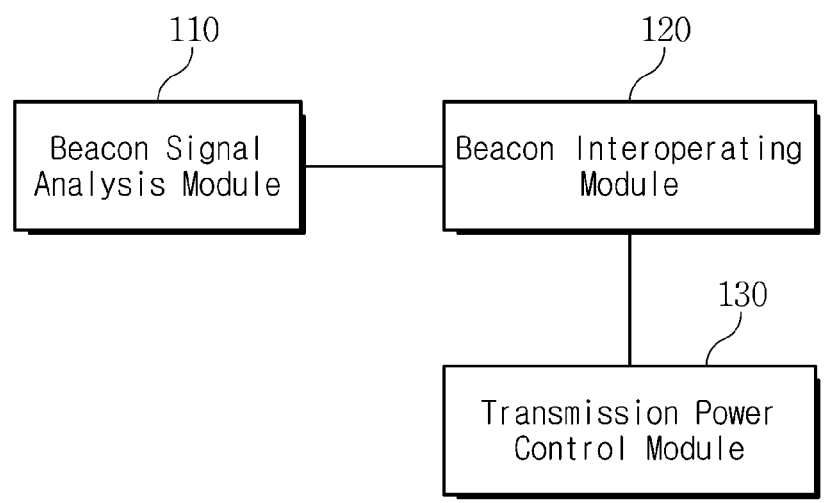
FIG. 5 is a block diagram showing a main configuration of a user terminal of FIG. 1 according to an embodiment of the present invention.

FIG. 5 is a block diagram showing a main configuration of a user terminal according to an embodiment of the present invention.

Referring to FIG. 5, a user terminal 100 according to an embodiment of the present invention may include a beacon signal analysis module 110, a beacon interoperating module 120, and a transmission power control module 130.

The term "module" used herein may be an element that performs a predetermined function and may be implemented in hardware, software, or a combination thereof. For example, the module may denote a program module, which includes elements that are executed by a processor to perform predetermined functions, such as software elements, object-oriented software elements, class elements, and task elements, and also processes, functions, attributes, procedures, sub-routines, segments of program codes, drivers, data, database, data structures, tables, arrays, and variables. In addition, the functions provided in the elements and the modules may be combined as a smaller number of elements and modules or further divided into additional elements and modules.

An operation of the user terminal 100 according to an embodiment of the present invention will be described below in more detail. First, the beacon signal analysis module 110 may receive a beacon signal transmitted from at least one beacon device 200 located within a certain radius through short-range wireless communication. Preferably, the user terminal 100 serves to receive and analyze a beacon signal transmitted according to a Bluetooth low energy (BLE) communication protocol.

In this case, the beacon signal analysis module 110 may analyze a received signal strength indicator of the beacon signal, i.e., the power level of the beacon signal.

The user terminal 100 according to an embodiment of the present invention may be equipped with a beacon communication module and configured to perform a function of transmitting a beacon signal like the beacon device 200.

The beacon interoperating module 120 of the user terminal 100 according to an embodiment of the present invention generates a user message through the beacon signal analyzed through the beacon signal analysis module 110.

The beacon interoperating module 120 generate a user message including received signal strength, beacon signal identification information, and user terminal identification information with respect to the beacon signal received from the beacon signal analysis module 110. In addition, the beacon interoperating module 120 may further include personal setting information input through an application installed in the user terminal 100 in the user message in association with a beacon service.

Subsequently, the beacon interoperating module 120 transmits the user message, and the user message may be transmitted at a default power level.

The transmission power control module 130 may set a transmission power level and a control time of the beacon communication module of the user terminal 100 according to the transmission power control message generated by the management server 300 and received from the beacon device 200.

In addition, the user terminal 100 may transmit a beacon signal according to the transmission power level and control time of the beacon communication module that are set by the transmission power control module 130.

In addition, the user terminal 100 according to an embodiment of the present invention may receive the service information from the management server 300. In this case, the service information may include product information, coupon information, discount information, promotion information, and so on. The user terminal 100 may receive and then output the service information.

In this case, the user terminal 100 may receive the information in the form of a message according to the output information of the information transferred from the management server 300 or may provide various output and alarm functions in the application by running an application installed therein.

The transmission and reception of beacon signals between the user terminal 100 and the beacon device 200 according to an embodiment of the present invention may be preformed through BLE-based wireless communication in a network interface shown in FIG. 4.

In addition, the transmission and reception of data between the user terminal 100 and the management server 300 and the transmission and reception of data between the beacon device 200 and the management server 300 may be performed through mobile communication in the network interface 28 shown in FIG. 4.

A configuration of a management server according to an embodiment of the present invention will be described below with reference to FIG. 6.

Figure 6:
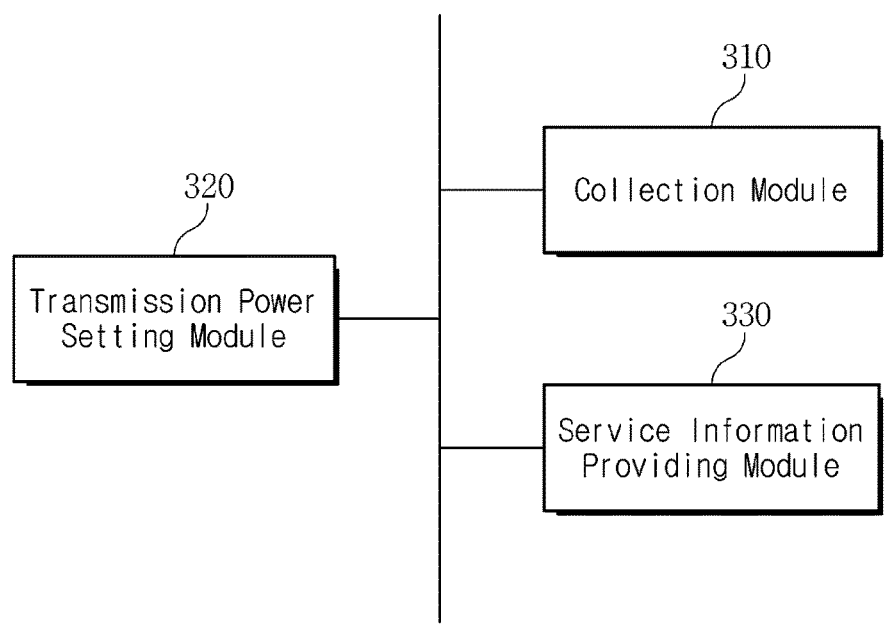
FIG. 6 is a block diagram showing a main configuration of a management server of FIG. 1 according to an embodiment of the present invention.

Referring to FIG. 6, the management server 300 may include a collection module 310, a transmission power setting module 320, and a service information providing module 330.

The collection module 310 of the management server 300 according to an embodiment of the present invention may receive a user message from the user terminal 100 through the beacon device 200 and may extract, collect, and manage location information, a reception power level, and personal setting information of the user terminal 100 from the received user message.

Furthermore, the transmission power setting module 320 may set the transmission power level of the beacon communication module of the user terminal 100 and the control time during which the set transmission power is maintained, according to a result of the collection performed by the collection module 310. That is, the transmission power setting module 320 may generate a message for controlling the power to be transmitted by the user terminal 100 for a certain time at a certain level according to information of the user terminal 100 collected through the user message and may transmit the generated message to the user terminal 10 via the beacon device 200.

The service information providing module 330 may provide personalized service information to the user terminal 100 through wired/wireless communication according to the user's location on the basis of information (e.g., personal setting information, location information, etc.) of the user terminal 100 collected from the user message by the collection module 310.

For example, when the user terminal 100 is located around the shop entrance, the service information may include one or more of location information, shop-related additional information (e.g., a WiFi password, etc.), shop-associated event information, user point and accumulation information, personal coupon information, shop use information, a shop welcome greeting message, and customer class-based coupon information. When the user terminal 100 is located around a sale stand for a certain product, the service information may include product information, coupon information, discount information, promotion information, and event information, which are associated with the certain product. In addition, when the user terminal 100 is located around a POS device, the service information providing module 330 may classify the user terminal 100 as a customer who will make payment and may provide service information including one or more of coupon information, discount information, promotion information, and event information of a product to be paid for.

Figure 7:
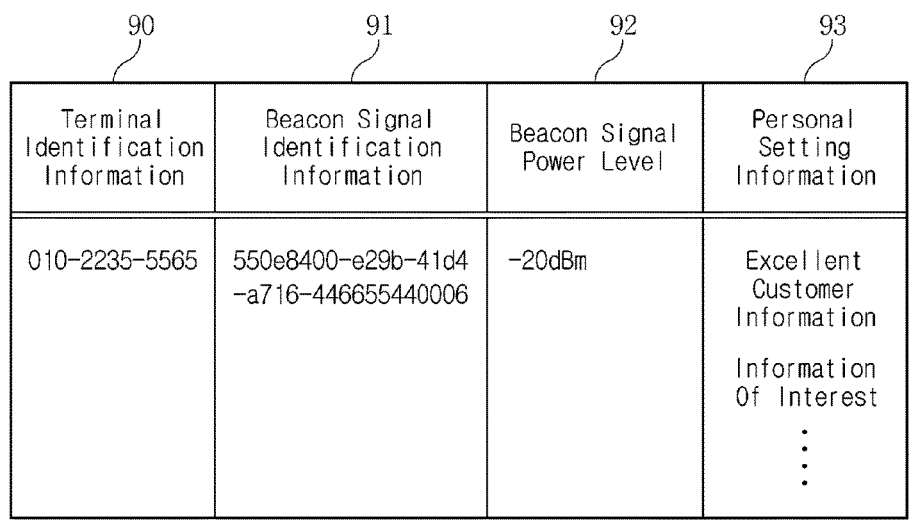
FIG. 7 is an exemplary view showing a user message generated by a user terminal according to an embodiment of the present invention.

FIG. 7 shows an exemplary diagram of a configuration of a user message generated by the user terminal 100.

Referring to FIG. 7, the user message may include one or more of terminal identification information 90, beacon signal identification information 91, a beacon signal power level 92, and personal setting information 93.

Here, the terminal identification information 90 may include at least one of an International Mobile Station Equipment Identity (IMEI), an electronic serial number (ESN), and a mobile identification number (MIN). In the exemplary diagram, a mobile identification number indicating a phone number of the user terminal 100 is selected as the terminal identification information.

The beacon signal identification information 91 may include at least one of a universally unique identifier (UUID) of the beacon device 200, a major indicating a group of beacon devices, and a minor indicating a certain beacon device in the beacon device group. In the exemplary diagram, a general-purpose unique identifier is selected as the beacon identification information 91.

The beacon signal power level 93 denotes a Received Signal Strength Indicator (RSSI) of a beacon signal. In the exemplary diagram, a beacon signal of the beacon device 200 transmitted at −20 dBm is received, and the beacon signal is analyzed by the beacon signal analysis module 110 of the user terminal 100 and contained in the user message.

In addition, the personal setting information may be extracted on the basis of information input to an application installed in the user terminal 100 and may include at least one of a user name, a favorite shop, a customer class, and user interest information. In the exemplary diagram, excellent customer information and interest information are selected and included in the user message.

The user message is a message under Advertising channel of the user terminal 100 and may be generated through a user application and transmitted with the beacon signal.

A detailed operation of the user terminal 100 according to an embodiment of the present invention will be more apparently understood with reference to the following flowchart.

A service method of the user terminal according to an embodiment of the present invention will be described below.

Figure 8:
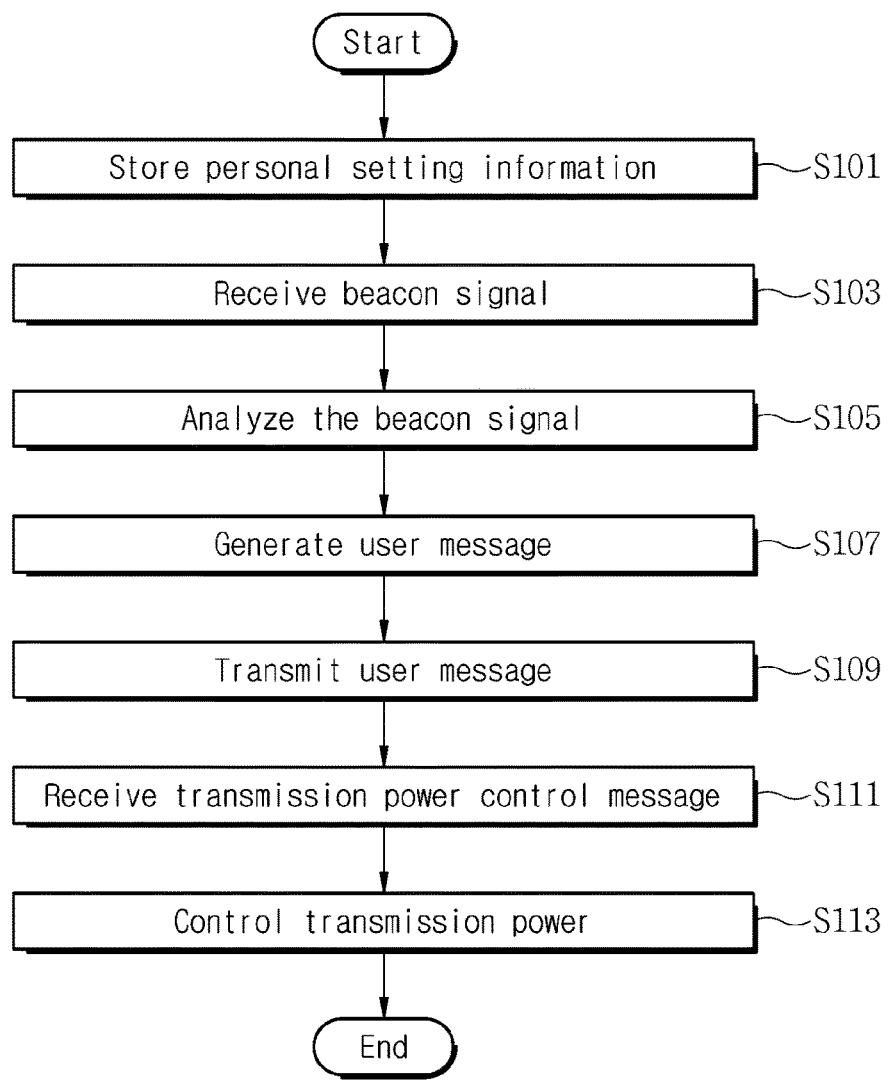
FIG. 8 is a flowchart illustrating a service method of a user terminal according to an embodiment of the present invention.

FIG. 8 is a flowchart illustrating a service method of a user terminal according to an embodiment of the present invention.

Referring to FIG. 8, the user terminal 100 stores personal setting information input through an application installed therein (S101). Subsequently, the user terminal 100 receives a beacon signal from the beacon device 200 (S103) and analyzes the beacon signal through the beacon signal analysis module 110 (S105). In this case, the identification information and power level of the beacon signal may be extracted through the analysis of the beacon signal. The user terminal 100 generates a user message including the analyzed beacon signal information in addition to the personal setting information and user terminal identification information stored in S101 (S107).

Subsequently, the user terminal 100 transmits a user message at a default transmission power level (S109). The transmitted user message may be recognized by the beacon device 200 and transferred to the management server 300. The user terminal 100 generates and transmits a user message to the management server 300 and receives a transmission power control message from the management server 300 (S111). The user terminal 100 may set a transmission power level and a control time of the user terminal 100 on the basis of the transmission power control message (S113).

A service method of the management server 300 according to an embodiment of the present invention will be described below.

Figure 9:
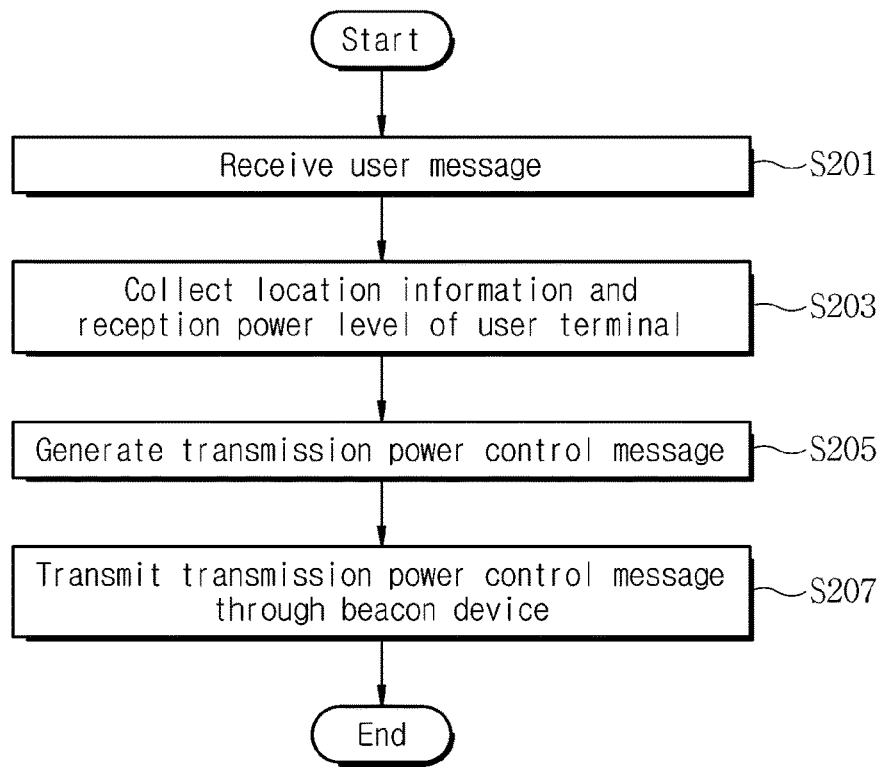
FIG. 9 is a flowchart illustrating a transmission power control message generation method of a management server according to an embodiment of the present invention.

FIG. 9 is a flowchart illustrating a transmission power control message generation method of a management server according to an embodiment of the present invention.

Referring to FIG. 9, the management server 300 according to an embodiment of the present invention receives a user message (S201). Subsequently, the management server 300 analyzes the user message and collects received signal strength, beacon identification information, and user terminal identification information, which are associated the beacon signal received by the user terminal (S203). In this case, the user terminal 100 estimates its location on the basis of the collected information.

In addition, the management server 300 may further collect personal setting information of the user terminal 100 in addition to the information and the reception power strength.

Subsequently, the management server 300 generates a transmission power control message (S205). The transmission power control message may be generated by the transmission power setting module 320 of the management server 300. The management server 300 may transmit the transmission power control message through the beacon device (S207). The beacon device may transmit the transmission power control message to the user terminal 100.

In this case, the transmission power control message may further set a transmission power level and a control time of the user terminal.

A method of setting transmission power of a user terminal by a management server according to an embodiment of the present invention will be described below.

FIG. 10 is a flowchart illustrating a transmission power setting method of a management server according to an embodiment of the present invention.

Referring to FIG. 10, the management server 300 receives a user message and calculates location information of the user terminal 100 (S301). Subsequently, the management server 300 determines where the user terminal 100 is located in a shop according to the location information of the user terminal 100 (S303). When the location information approaches a POS device, the management server 300 controls the transmission power level of the user terminal to be low (S305). This command may be transmitted through the transmission power control message. In addition, when the user terminal 100 is located around the POS device, the management server 303 determines whether the user terminal 100 is located proximate to a shop entrance (S307). When the user terminal 100 is located around the shop entrance, the management server may control the transmission power level of the user terminal to be high (S309). This command may be transferred through the transmission power control message. Furthermore, the management server 300 determines whether the user terminal 100 is located not around the shop entrance but around a sale stand for a certain product (S311). When the user terminal 100 is located proximate to the sale stand, the management server may control the transmission power level according to characteristics of the sale stand (S313). This command may also be transmitted through the transmission power control message.

When a transmission power message is generated through the above process, the management server 300 according to an embodiment of the present invention may set a control time for which the set transmission power level is maintained together with the transmission power message. Thus, the user terminal 100 according to an embodiment of the present invention may transmit the bacon signal with transmission power controlled to be very low, and the beacon device 200 may be prevented from not receiving the transmission power controlled to be very low from the user terminal 100 due to movement of the user terminal 100.

A beacon signal power control service procedure according to an embodiment of the present invention will be described below. FIG. 11 is a sequence diagram illustrating a beacon signal power control service procedure according to an embodiment of the present invention.

Referring to FIG. 11, the user terminal 100 according to an embodiment of the present invention inputs personal setting information through an application installed in the user terminal 100 and stores the personal setting information (S401). Subsequently, when a beacon device installed in a shop transmits a beacon signal (S403), the user terminal 100 receives and analyzes the beacon signal (S405), and generates a user message on the basis of the analysis (S407). The user terminal 100 transmits the user message at a default transmission power level, and the beacon device 200 performs a process of receiving and transmitting the user message to the management server (S409).

Subsequently, the management server 300 may receive and analyze the user message and may extract and collect location information and reception power level of the user terminal 100 (S411). In this case, the management server 300 may further collect personal setting information of the user terminal 100 from the user message.

The management server 300 may generate a transmission power control message on the basis of the collected information (S413) and transmit the transmission power control message to the user terminal 100 via the beacon device 200 (S415).

The user terminal 100 may receive the transmission power control message and controls the transmission power to be transmitted by the user terminal 100 (S417).

The specification includes details of a number of specific implements, but it should be understood that the details do not limit any invention or what is claimable in the specification but rather describe features of the specific embodiment. Features described in the specification in the context of individual embodiments may be implemented as a combination in a single embodiment.

In contrast, features described in the specification in the context of a single embodiment may be implemented in multiple embodiments individually or in an appropriate sub-combination. Furthermore, the features may operate in a certain combination and may be initially described as claimed in the combination, but one or more features may be excluded from the claimed combination in some cases, and the claimed combination may be changed into a sub-combination or a modification of a sub-combination.

Similarly, even though operations are described in a certain order on the drawings, it should not be understood that the operations be executed in the certain order or in a sequential order to obtain desired results, or that all the operation be executed. In some cases, multitasking and parallel processing may be beneficial. In addition, it should not be understood that the separation of various system components in the above described embodiments is required in all embodiments, and it should be understood that the above described program components and systems may be incorporated into a single software product or may be packaged in multiple software products.

Thus, particular embodiments have been described. Other embodiments are within the scope of the following claims. For example, the operations recited in the claims can be performed in a different order and still achieve desirable results. As an example, operations depicted in the drawings in a particular order should not be understood as requiring that such operations be performed in the particular order shown or in sequential order. In certain implementations, multitasking and parallel processing may be advantageous.

This written description sets forth the best mode of the invention and provides examples to describe the invention and to enable a person of ordinary skill in the art to make and use the invention. The specification drafted as such is not limited to detailed terms suggested in the specification. Accordingly, it will be apparent to those skilled in the art that various modifications, changes, and variations may be made in the example without departing from the scope of the invention.

Accordingly, the scope of the present invention should be defined not by the embodiments but by the claims.

It should be understood that the embodiments disclosed herein are merely illustrative and are not intended to limit the scope of the invention. Although specific embodiments have been illustrated and described herein, it is obvious to those skilled in the art that many modifications of the present invention may be made without departing from what is intended to be limited solely by the appended claims.

The present invention is directed to a method and apparatus for controlling a power level of a beacon signal. More particularly, the method and apparatus may control a transmission power level of a user terminal through communication between a beacon device installed in a shop and a beacon communication module of the user terminal and easily provide personalized service information in consideration of location information and personal setting information of the user terminal.

Moreover, the present invention has industrial applicability in that the present invention can contribute to the development of industry and also in that the possibility of sales or business is sufficient and also actually the present invention may be carried out.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

What is claimed is:

1. A user terminal having a beacon communication module configured to transmit and receive signals to and from one or more beacon devices, the user terminal comprising:
   a beacon signal analysis module that, when a beacon signal periodically transmitted from a beacon device is received, analyzes the beacon signal to extract received signal strength and beacon identification information;
   a beacon interoperating module that
      generates a user message including the received signal strength, the beacon identification information, personal setting information message in association with a beacon service of the user terminal and an user terminal identification information,
      transmits the generated user message to a management server through the beacon device, and
      receives a transmission power control message from the management server through the beacon device; and
   a transmission power control module that, when the transmission power control message is received, controls signal transmission power of the beacon communication module according to the transmission power control message,
   wherein the transmission power control message includes a transmission power level that is set by the management server depending on a location of the user terminal, the user terminal, the personal setting information, and the received signal strength.

2. The user terminal of claim 1, wherein the transmission power control message further includes a control time period, and the transmission power control module changes the transmission power of the beacon communication module to the transmission power control level during the control time period, when the transmission power control message is received.

3. A management server comprising:
   a collection module that receives a user message from a user terminal through one or more beacon devices and collects received signal strength, beacon identification information, a personal setting information in association with a beacon service of the user terminal and user terminal identification information of a beacon signal received from the user terminal from the user message; and
   a transmission power setting module that
      analyzes the beacon signal and a change in strength thereof, which are received from the user terminal, based on the received signal strength, beacon identification information, and user terminal identification information collected by the collection module,
      estimates a location of the user terminal,
      sets a transmission power level of the user terminal according to the location of the user terminal, the personal setting information, and the received signal strength,
      generates a transmission power control message for controlling transmission power of the user terminal to be at the set transmission power level during the control time period, and
      transmits a transmission power control message to the user terminal through a corresponding beacon device.

4. The management server of claim 3,
   wherein the transmission power control message further includes a control time period, and the user terminal changes a transmission power of the beacon communication module to the transmission power control level during the control time period.

5. The management server of claim 3, wherein the transmission power setting module generates a transmission power control message for decreasing signal transmission power of the user terminal when the user terminal is located near a payment device and for increasing the signal transmission power of the user terminal when the user terminal is located near an entrance of the shop.

6. A method of providing a beacon service through a user terminal having a beacon communication module configured to transmit and receive signals to and from one or more beacon devices, the method comprising:
   receiving a beacon signal transmitted from a beacon device;
   analyzing the received beacon signal to extract received signal strength and beacon identification information;
   generating a user message including the received signal strength, the beacon identification information, a personal setting information in association with a beacon service of the user terminal and an user terminal identification information;
   transmitting the user message to the beacon device; and
   receiving a transmission power control message from a management server and controlling transmission power of the beacon communication module according to the transmission power control message,
   wherein the transmission power control message includes a transmission power level that is set by the management server depending on a location of the user terminal, the personal setting information, and the received signal strength.

7. The method of claim 6, wherein the transmission power control message further includes a control time period; and the controlling of transmission power comprises changing the transmission power of the beacon communication module to the transmission power level during the control time period.

8. The method of claim 7, wherein the controlling of the transmission power comprises decreasing signal transmission power of the user terminal low when the user terminal is located near a payment device, and increasing the signal transmission power of the user terminal when the user terminal is located near an entrance of the shop.

* * * * *